United States Patent [19]
Roche

[11] Patent Number: 5,319,932
[45] Date of Patent: Jun. 14, 1994

[54] POWER SENSING REGENERATOR

[75] Inventor: Richard M. Roche, Gresham, Oreg.

[73] Assignee: Roche Engineering Corporation, Portland, Oreg.

[21] Appl. No.: 54,672

[22] Filed: Apr. 28, 1993

[51] Int. Cl.⁵ .............................................. F16D 31/02
[52] U.S. Cl. ..................... 60/419; 60/450; 60/452; 60/468; 91/532
[58] Field of Search .............. 60/419, 450, 452, 468, 60/494; 91/532

[56] References Cited

U.S. PATENT DOCUMENTS

| | | |
|---|---|---|
| 986,780 | 3/1911 | Sundh . |
| 1,156,818 | 10/1915 | Rich . |
| 2,023,524 | 12/1935 | Heaton . |
| 2,060,220 | 11/1936 | Kennedy . |
| 2,257,108 | 9/1941 | Cornwell . |
| 2,370,526 | 2/1945 | Doran . |
| 2,374,588 | 4/1945 | Doran . |
| 2,549,989 | 4/1951 | Simonds . |
| 2,616,259 | 11/1952 | Quintilian . |
| 2,839,884 | 6/1958 | McGill . |
| 2,933,897 | 4/1960 | Toutant . |
| 3,038,312 | 6/1962 | Marsh . |
| 3,039,266 | 6/1962 | Schenkelberger . |
| 3,124,781 | 4/1964 | Stein . |
| 3,203,185 | 8/1965 | Williams . |
| 3,401,520 | 9/1968 | Dineen . |
| 3,443,379 | 5/1969 | Weisenbach . |
| 3,448,577 | 6/1969 | Crawford ............... 91/532 |
| 3,582,245 | 6/1971 | Wallace ................. 60/419 |
| 3,702,642 | 11/1972 | Greene . |
| 3,856,436 | 12/1974 | Lonnemo .............. 60/450 |
| 3,922,854 | 12/1975 | Coeurderoy . |
| 3,964,260 | 6/1976 | Williams et al. . |
| 3,989,117 | 11/1976 | Hill . |
| 4,087,968 | 5/1978 | Bianchetta . |
| 4,089,169 | 5/1978 | Miller ................... 60/450 |
| 4,199,943 | 4/1980 | Hunt . |
| 4,245,964 | 1/1981 | Rannenberg . |
| 4,381,904 | 5/1983 | Kyte et al. . |
| 4,561,341 | 12/1985 | Aikawa . |
| 4,649,706 | 3/1987 | Hutson ................. 91/532 |
| 4,712,376 | 12/1987 | Hadank et al. . |

FOREIGN PATENT DOCUMENTS 2232692  1/1975  France .

OTHER PUBLICATIONS

*Hydraulic Control Systems*, by Herbert E. Merritt, pp. 334–341 in Chapter 12.
John S. Barnes Corporation Advertisement for Rotary Flow Dividers (D–Series).
"Technical update on hydraulic pumps and meters," from *Hydraulics & Pneumatics*, Oct. 1987, pp. 61–74.
"Regenerative Circuits," from *Design Engineers Handbook*, pp. b-29-b-31. (Parker-Hannifin, Publ.-1973.
"Double cylinder speed with a flow divider" by Edgar Trinkel, Jr., *Hydraulics & Pneumatics*, Mar. 1986, p. 18.
Energie Fluide, vol. 13, No. 67, Jan. 1974, pp. 33–39 'Le Diviseur de Debit Rotatif'-p. 39, FIG. 7.
"Variable Delivery from a gear pump," from *Design Engineers* Handbook, pp. i–21-i–24.

*Primary Examiner*—Edward K. Look
*Assistant Examiner*—F. Daniel Lopez
*Attorney, Agent, or Firm*—Eugene Stephens & Associates

[57] ABSTRACT

A power sensing regenerator includes a pair of displacers (24 and 26) connected in tandem for dividing a flow of fluid from a pump (12) into predetermined proportions for servicing one or more loads (42). Flow control valves (32 and 34) regulate respective flows from the displacers (24 and 26) to the one or more loads (42). A control system, which includes differential pressure regulators of the flow control valves (32 and 34), responds to a difference between discharge pressures of the displacers (24 and 26) for reducing discharge pressure of the pump (12).

55 Claims, 6 Drawing Sheets

POWER SENSING REGENERATOR

TECHNICAL FIELD

The invention relates to the field of fluid power systems and, in particular, to such systems incorporating devices for saving energy.

BACKGROUND

The design of fluid power systems often reflects a compromise between efficiency and the combination of complexity and response time. For example, increased efficiency is often gained at a cost of both increased complexity and decreased response time.

Some of the least complex and fastest responding fluid power systems generate fluid power with fixed displacement pumps that are sized to satisfy a demand for a given flow rate at a system pressure. Any excess flow that is not required to sustain the system pressure is exhausted by a relief valve but is otherwise available at the system pressure to satisfy a demand for additional flow. Energy losses are calculated as a product of the volume of exhausted fluid and its drop in pressure. Additional losses are associated with throttling that may be required to satisfy a demand for reduced pressure by a load.

Efficiency can be improved by adding a so-called "priority unloading" valve that maintains a predetermined compensating differential pressure across a restrictor between the fixed displacement pump and a load. The compensating differential pressure across the restrictor is maintained by exhausting any excess flow before it reaches the restrictor. Output pressure of the pump is limited to the sum of the compensating differential pressure across the restrictor and an instant load pressure demand.

Any excess flow that is not required to sustain the compensating differential pressure across the restrictor is exhausted at the output pressure of the pump, which may be significantly less than the system pressure limit maintained by the relief valve. Throttling losses are also limited by the compensating differential pressure. Although the excess flow is available to satisfy a demand for additional flow, response time may be decreased by the reduced pressure at which the excess flow is available.

A further improvement in efficiency can be made by replacing the fixed displacement pump and priority unloading valve with a pressure compensated variable displacement pump. The output capacity of the variable displacement pump is varied to sustain the system pressure. Although no excess flow is produced, considerable throttling may be necessary to satisfy a demand for a reduced pressure by a load. Instant demands for increased pressure are satisfied by reduced throttling, but the output capacity of the pump must be varied to sustain the pressure increase.

Generally, the highest efficiencies are exhibited by so-called "load sensing" systems in which the output capacity of a variable displacement pump is controlled to maintain a predetermined operating differential pressure across a flow control valve. No excess flow is produced and throttling losses across the flow control valve are limited by the operating differential pressure. However, neither additional flow nor additional pressure is available to significantly reduce response time over the time required to vary the output capacity of the variable displacement pump.

Nonetheless, even the most efficient load sensing systems waste considerable energy in branch lines that convey fluid to separate loads having unequal pressure demands. Although load sensing systems can limit throttling losses in the highest pressure branch to the operating differential pressure, all of the other branches are supplied at the same output pressure of the variable displacement pump and require additional throttling. Such energy losses are increased by either reduced pressure or increased flow demands in the lower pressure branches.

Similar energy losses also occur in branches supplied by fixed displacement pumps. Typically, all of the branches are supplied at the predetermined output pressure of the fixed displacement pump, and throttling losses in each branch depend upon the amount of flow in each branch and upon the difference between the predetermined output pressure of the pump and the individual load pressure demands of each branch. Significant disparities in flow rate and pressure between branches produce considerable energy losses.

Flow dividers have been used in branch circuits to apportion different amounts of flow between the branches. Some flow dividers are made up of pressure compensated restrictors that divide the flow into fixed proportions independently of inlet pressure. Although throttling losses at flow control valves in the branch circuits are reduced, the total losses in each branch, combining the throttling losses at the flow control valves with the throttling losses at the pressure compensated restrictors, remain the same.

However, gangs of fixed size displacers (e.g., gear pump/motor devices) have also been used to divide flow between branches in proportion to the respective capacities of the displacers. Although the displacers maintain flows in fixed proportions, a reduction in outlet pressure of one displacer, so operating as a motor, is converted into an increase in outlet pressure of another displacer, so operating as a pump. The variation in outlet pressures distributes fluid power in different proportions to the branches, but the total power delivered to all of the branches remains constant. Any reduction in the total power demand of the branches with respect to a constant power delivered to the displacers is lost as wasted energy.

SUMMARY OF INVENTION

My invention, which I have termed a "power sensing regenerator", provides for saving energy in fluid power systems that deliver pressurized fluid to one or more loads. My regenerator saves energy by reducing the power requirements of a power unit supplying the pressurized fluid to more closely match the total demand for the pressurized fluid by the loads. The regenerator has wide applicability for saving energy in fluid power systems supplied by either fixed or variable displacement pumps.

An elementary version of my regenerator can be configured with a pair of displacers that are mechanically coupled to each other for dividing a flow of pressurized fluid into predetermined proportions. The pressurized flow of fluid is conducted along a working line to a common inlet of the displacers at a supply pressure that is subject to variation. Two other working lines connect outlets of the two displacers to inlets of two flow control valves for conducting separate portions of the flow of fluid at respective discharge pressures of the two displacers. The two flow control valves regulate the flow of fluid to one or more loads. A control system responds to a difference between the discharge pressures of the two displacers for reducing the supply pressure with respect to the higher of the two displacer discharge pressures. The reduction in the supply pressure reduces the power requirements of the power unit supplying the flow of pressurized fluid. The useful work accomplished by the displacers, which reduces the power requirements of the power unit, is referred to herein as "regeneration".

The two flow control valves can be operated independently for regulating the flow of fluid to two different loads or can be operated together for regulating the flow of fluid to a single load. In addition, the flow control valves, which are preferably pressure compensated, can be constructed as adjustable bypass, restrictor, or combination bypass and restrictor type valves depending upon the further details of the system in which my regenerator is used.

For example, two adjustable bypass type pressure compensated flow control valves can be operated together in a predetermined sequence for regulating the flow of fluid supplied by a fixed displacement pump to a single load. Outlets of both valves are connected to the single load. At desired flow rates less than the capacity of either displacer, one of the flow control valves is positioned in a tandem (closed) condition and returns the entire flow through one of the displacers to a reservoir. The accompanying decrease in pressure across the one displacer is converted into a proportional increase in pressure across the other displacer for satisfying the load pressure demand at a lower supply pressure to both displacers. Preferably, the two displacers have unequal capacities for saving energy over a wider range of flow demands.

Similar bypass type flow control valves can be used in my regenerator for independently regulating flow rates to two or more loads within a system supplied by a fixed displacement pump. The displacers are relatively sized to convey predetermined maximum flow rates to each load. Differences between demand pressures of the loads are converted into useful work for reducing the supply pressure to the displacers, along with the power requirements for generating the supply pressure.

The bypass type flow control valves regulating flows to multiple loads are preferably constructed from components that combine functions of pressure compensation and pressure relief. A throttle valve provides an adjustable amount of restriction. A first pressure relief valve connected in parallel with the throttle valve maintains a predetermined compensating differential pressure across the throttle valve by exhausting excess flow to the reservoir. A second pressure relief valve is connected to a pilot line of the first pressure relief valve from the outlet of the throttle valve for limiting pressure in the outlet pilot line to a predetermined pressure setting. A restrictor limits flow in the outlet pilot line. Accordingly, pressure on the inlet side of the throttle valve, having a magnitude exceeding the combined pressure settings of both relief valves, is relieved by exhausting excess flow through the first pressure relief valve.

Restrictor type pressure compensated flow control valves can be used in my regenerator for independently regulating flow rates to two loads within a system supplied by a load sensing variable displacement pump. Pilot lines deliver signals controlling the geometric capacity of the variable displacement pump for maintaining a predetermined operating differential pressure across the flow control valve that regulates flow to the higher pressure load. Modulating valves permit flow through additional working lines that bypass the displacers to prevent differential pressures across either flow control valve from falling below a predetermined modulating differential pressure for maintaining desired flow rates to the loads.

The operating differential pressure is set less than the modulating differential pressure to make sure that the desired flow rate to the higher pressure load is satisfied independently of the desired flow rate to the lower pressure load. However, when a ratio of the desired flow rates to the lower and higher pressure loads exceeds a ratio of the geometric capacities of the displacers supplying the flow rates to the loads, the displacer supplying flow to the lower pressure load operates as a motor for driving the other displacer supplying the higher pressure load as a pump. Check valves in series with the modulating valves enable the discharge pressure of the displacer operating as a pump to exceed the supply pressure to the displacers.

Combination bypass and restrictor type pressure compensated valves can be used to replace restrictor type valves in my regenerator for independently regulating flow rates to two or more loads within systems supplied by either load sensing or pressure compensated variable displacement pumps. Recirculating lines connect each of three flow control valves with a working pressure line between the variable displacement pump and the inlet of the displacers. The recirculating lines allow one or more of the displacers to operate as an recirculator, while the other displacers operate as a pump or as motors.

However, in systems supplied by load sensing variable displacement pumps, the compensating differential pressure setting of the flow control valves is preferably set higher than the operating differential pressure setting of the variable displacement pump to prevent any recirculation of flow through the flow control valve that regulates flow to the highest pressure load. As a result, the flow control valve that regulates flow to the highest pressure load operates as a restrictor type valve for limiting rotational speed of the displacers and for sustaining variations in the actual division of flow between the displacers to compensate for volumetric inefficiencies of the displacers.

The geometric capacity of pressure compensated variable displacement pumps is varied to maintain the highest discharge pressure of the displacers at a predetermined setting. The supply pressure is reduced with respect to the predetermined setting by regeneration. A valve logic network blocks any recirculation of flow through the flow control valve that regulates flow to the highest pressure load. Similar to systems supplied by load sensing variable displacement pumps, the flow control valve that regulates flow to the highest pressure load operates as a restrictor type valve for sustaining variations in the actual division of flow between the displacers.

A special configuration of lines can also be used to connect an additional displacer in parallel with the displacer having the highest outlet pressure. This decreases mechanical advantage of the displacers operating as motors with respect to the other displacers but also decreases the rate of flow that is required to operate one or more displacers as motors. In other words, less energy can be saved at certain combinations of flow rates to the loads, but energy can be saved at many more combinations of flow rates.

DRAWINGS

DETAILED DESCRIPTION

Figure 1:
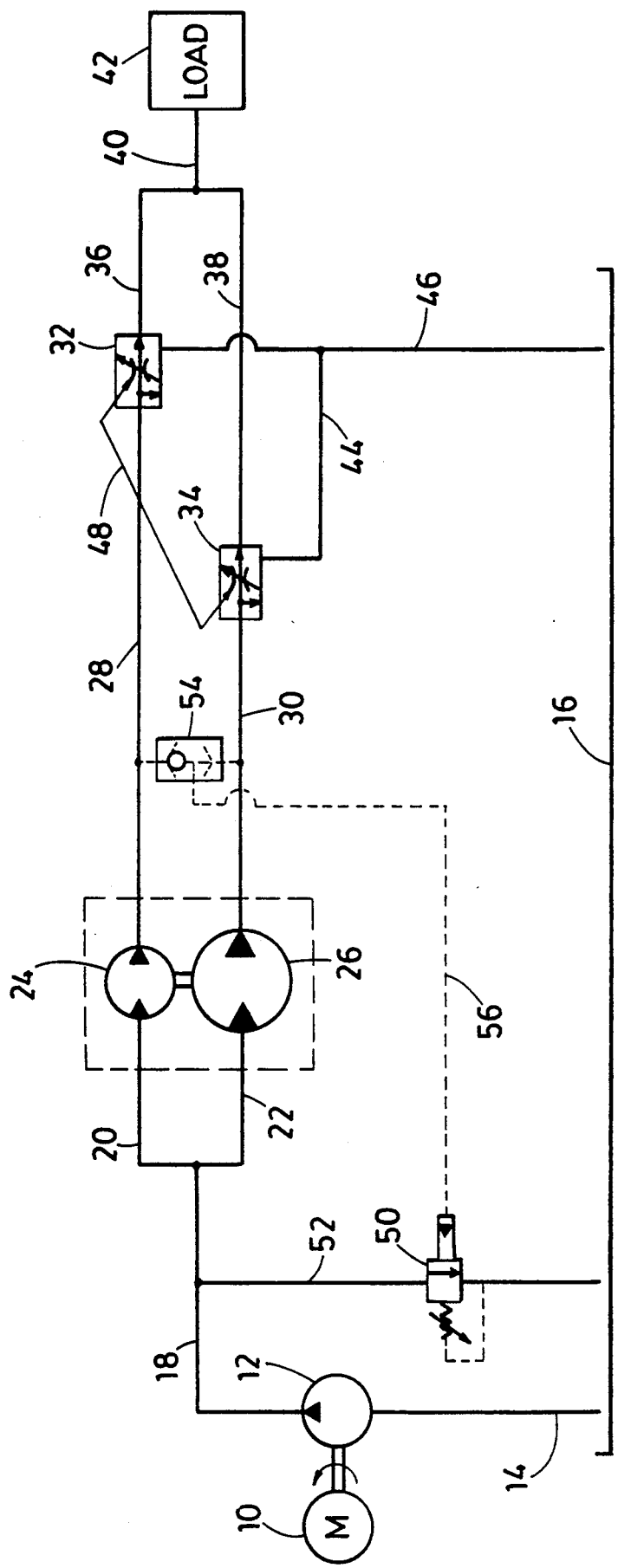
FIG. 1 is a circuit diagram showing my regenerator configured with two displacers and two bypass type pressure compensated flow control valves that are operatively connected for regulating flow of pressurized fluid to a single load within a fluid power system supplied by a fixed displacement pump.

My power sensing regenerator is depicted in FIG. 1 within a fluid power system powered by a prime mover 10 coupled to a fixed displacement pump 12. A pump inlet line 14 conveys a supply of working fluid from a reservoir 16 to an inlet port of the fixed displacement pump 12. A working line 18 splits into two branch lines 20 and 22 for conveying pressurized fluid from an outlet port of the fixed displacement pump 12 to respective inlet ports of a pair of displacers 24 and 26.

The displacers 24 and 26, which are operable as pumps or motors, have fixed geometric capacities for dividing the pressurized flow of fluid from the fixed displacement pump 12 into two predetermined proportions. Gears are preferably used as the working members of the displacers 24 and 26, although pistons, vanes, or other fluid power converting members could also be used.

Working lines 28 and 30 convey pressurized fluid from respective outlet ports of the displacers 24 and 26 to inlet ports of two adjustable bypass type pressure compensated flow control valves 32 and 34. Joining lines 36 and 38 merge into a single working line 40 for conveying regulated flows of the pressurized fluid from respective outlet ports of the flow control valves 32 and 34 to a load 42, representing a power converting device such as a motor or cylinder. However, surplus fluid is diverted from the load 42 to the reservoir 16 along return lines 44 and 46 that connect exhaust ports of the flow control valves 32 and 34 to the reservoir 16.

A control linkage 48 adjusts the positions of both flow control valves 32 and 34 in a predetermined sequence for regulating the total flow of fluid through both flow control valves to the load 42. For example, at desired flow rates within the effective capacity of the smaller displacer 24, the flow control valve 34 is set in a tandem (closed) condition, and the flow control valve 32 meters all of the flow to the load 42.

The open flow control valve 32 maintains a pressure "$P_{d1}$" in the working line 28 at a predetermined compensating differential pressure setting "$dP_1$" above a demand pressure "$P_L$" in working line 40, whereas the flow control valve 34 maintains a pressure "$P_{d2}$" in the working line 30 at the compensating differential pressure setting "$dP_1$". The pressure difference between the working lines 28 and 30, which is equal to the demand pressure "$P_L$", is converted into useful work by operating the larger displacer 26 as a motor for driving the smaller displacer 24 as a pump. As a result, a pressure "$P_p$" within the working lines 18, 20, and 22 connecting the fixed displacement pump 12 to the displacers 24 and 26 is reduced.

Neglecting friction, the discharge pressure "$P_p$" of the fixed displacement pump 12 is related to the discharge pressures "$P_{d1}$" and "$P_{d2}$" of the displacers 24 and 26 as follows:

$$P_p = P_{d1} C_{d1} + P_{d2} C_{d2} \tag{1}$$

where "$C_{d1}$" is the fractional portion of the total geometric capacity of the displacers contributed by the displacer 24 and "$C_{d2}$" is the fractional portion of the total geometric capacity of the displacers contributed by the displacer 26. The amount "$P_r$" that the discharge pressure "$P_p$" of the pump 12 is reduced with respect to the discharge pressure "$P_{d1}$" of the displacer 24 is equal to the product of the demand pressure "$P_L$" and the fractional portion "$C_{d2}$" of the total displacer capacity contributed by the displacer 26 as set forth below:

$$P_r = P_{d1} - P_p = P_L C_{d2} \tag{2}$$

At desired flow rates to the load 42 beyond the capacity of the smaller displacer 24 but within the capacity of the larger displacer 26, the flow control valve 32 is set in a tandem (closed) condition, and the flow control valve 34 meters all of the flow to the motor 42. Accordingly, the discharge pressure "$P_{d1}$" of the displacer 24 is maintained at the compensating differential pressure setting "$dP_1$", and the discharge pressure "$P_{d2}$" of the displacer 26 is maintained at the compensating differential pressure setting "$dP_1$" above a demand pressure "$P_L$" of the load 42. The amount "$P_r$" of reduction in the pump discharge pressure "$P_p$" is equal to the product of the demand pressure "$P_L$" and the fractional portion "$C_{d1}$" of the total displacer capacity contributed by the displacer 24 as follows:

$$P_r = P_{d2} - P_p = P_L C_{d1} \tag{3}$$

The amount of energy savings "$E_s$" from operating either displacer 24 and 26 as a motor (i.e., the amount of regeneration) is equal to the product of the reduction "$P_r$" in pump discharge pressure and the effective output flow "$Q_p$" of the pump as written below:

$$E_s = P_r Q_p \tag{4}$$

Although no reduction in pump discharge pressure "$P_p$" is made at desired flow rates that exceed the capacity of the larger displacer 26, less energy is wasted at the higher desired flow rates. The flow control valve 34 remains fully open and the flow control valve 32 meters the desired additional flow. The displacer discharge pressures "$P_{d1}$" and "$P_{d2}$" of both displacers 24 and 26 are maintained at the compensating differential pressure setting "$dP_1$" above a demand pressure "$P_L$" of the load 42.

Excessive magnitudes of the displacer discharge pressures "$P_{d1}$" and "$P_{d2}$" in the working lines 28 and 30 are prevented by a pressure relief valve 50 that exhausts excess flow from the pump 12 at the lower pump discharge pressure "$P_p$" to the reservoir 16. The relief valve 50 is located along a return line 52 that extends from the working line 18 to the reservoir 16. A shuttle valve 54 between the working lines 28 and 30 communicates the higher of the two displacer discharge pressures "$P_{d1}$" and "$P_{d2}$" as a pilot pressure along pilot line 56 to the relief valve 50. Control pressures above a predetermined peak setpoint pressure open the relief valve 50 and allow excess flow from the pump 12 to return to the reservoir 16 for limiting displacer discharge pressures to the peak setpoint pressure.

Figure 2:
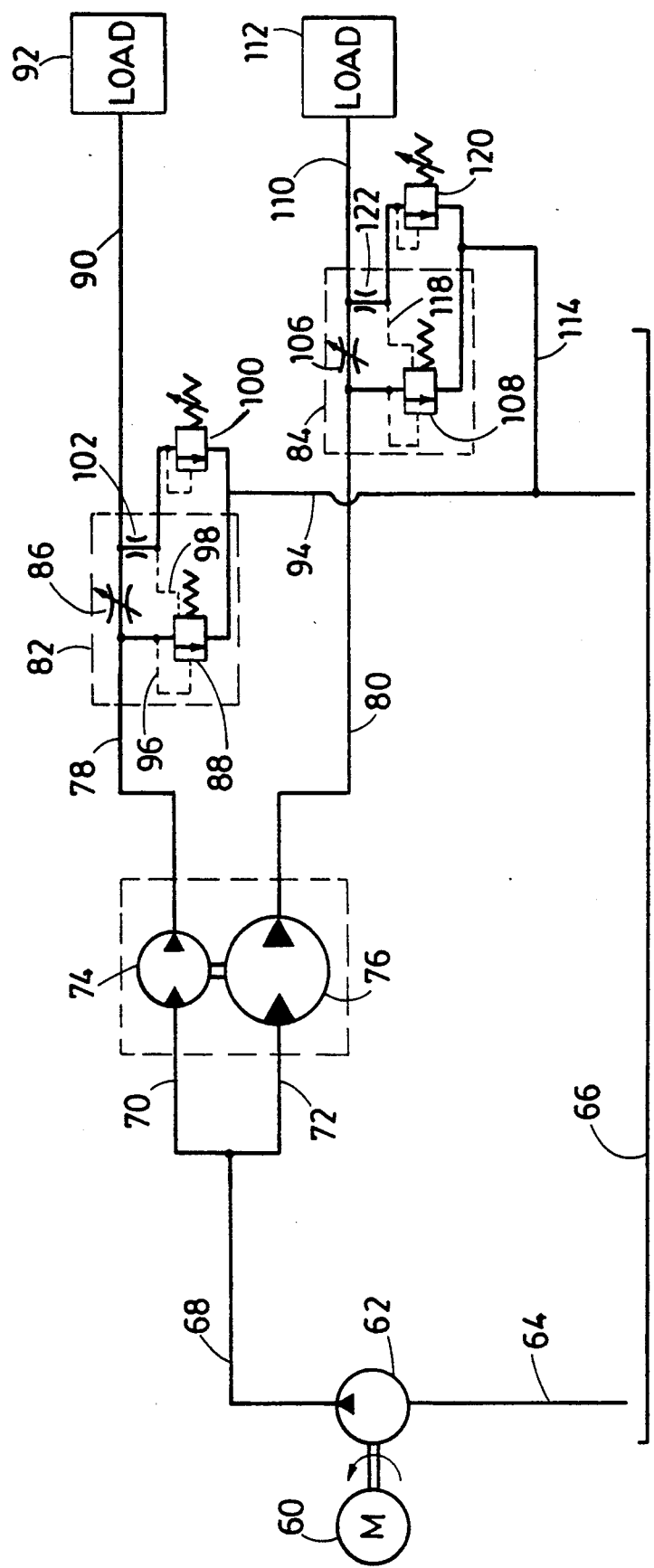
FIG. 2 is a circuit diagram showing my regenerator configured with two displacers and two bypass type pressure compensated flow control valves for independently regulating flows to two loads within a system supplied by a fixed displacement pump.

The remaining drawing figures show examples of my regenerator configured for saving energy in fluid power systems supplying pressurized fluid to two or more loads. However, similar to FIG. 1, my regenerator is depicted in FIG. 2 within a fluid power system powered by a prime mover 60 coupled to a fixed displacement pump 62. A supply of working fluid from a reservoir 66 is conducted along an inlet line 64 to an inlet port of the fixed displacement pump 62. A working line 68 splits into two branch lines 70 and 72 for conveying pressurized fluid from an outlet port of the fixed displacement pump 12 to respective inlet ports of a pair of displacers 74 and 76.

Also similar to the embodiment of FIG. 1, working lines 78 and 80 convey pressurized fluid from respective outlet ports of the displacers 74 and 76 to respective inlet ports of two adjustable bypass type pressure compensated flow control valves 82 and 84. However, the flow control valves 82 and 84 of FIG. 2 are depicted in component form to better illustrate an improvement that combines functions of pressure compensation and pressure relief within the valves.

The flow control valve 82 includes a throttle valve 86 having a variable size orifice and a differential pressure relief valve 88. The throttle valve 86 restricts flow between the working line 78 and a working line 90 to a first load 92. The differential pressure relief valve 88 limits pressure differences between the working lines 78 and 90 to the compensating pressure differential "$dP_1$" by exhausting excess flow from the working line 78 to the reservoir 66 along a return line 94. Pilot lines 96 and 98 communicate pilot pressures to the differential pressure relief valve 88 from the working lines 78 and 90. The differential pressure relief valve 88 compensates for different demand pressures "$P_L$" at individual flow settings of the throttle valve 86.

However, a pressure relief valve 100 is also connected to the flow control valve 82 to limit pressure in the working line 78. An inlet of the pressure relief valve 100, along with the pilot line 98 of the differential pressure relief valve 88, is connected to the working line 90 through a restrictor 102. Pressure in the pilot line 98 above a predetermined relief pressure setting is relieved by exhausting fluid from the pilot line 98 to the reservoir 66 along the return line 94. However, pressure in the working line 78, having a magnitude exceeding a sum of the compensating differential pressure "$dP_1$" and the relief pressure setting, is relieved by exhausting excess flow through the differential pressure relief valve 88 to the reservoir 66. Since the pressure relief valve 100 is merely used to influence operation of the differential pressure relief valve 88, the pressure relief valve 100 can be sized as a much smaller and less expensive component.

The flow control valve 84 includes similar components, including a throttle valve 106 that restricts flow between the working line 80 and a working line 110 to a second load 112 and a differential pressure relief valve 108 that limits differential pressures between the working lines 80 and 110 by exhausting excess flow from the working line 80 to the reservoir 66 along a return line 114. Pilot pressures are communicated to the differential pressure relief valve 108 from the working lines 80 and 110 by pilot lines 116 and 118. An inlet of a pressure relief valve 120, together with the pilot line 118, is connected to the working line 100 through a restrictor 122. The pressure relief valve 120 is sized with respect to the restrictor 122 to limit pressure in the pilot line 118 to the relief pressure setting.

Except at maximum system pressure regulated by the pressure relief valves 100 and 120, pressures in the working lines 78 and 80, i.e., displacer discharge pressures "$P_{d1}$" and "$P_{d2}$", closely follow pressures in working lines 90 and 110, i.e., load demand pressures "$P_{L1}$" and "$P_{L2}$". In fact, since the only restrictions between the lines 78 and 90 and the lines 80 and 110 are the throttle valve portions 86 and 106 of the bypass type flow control valves, the only difference between the respective discharge pressures "$P_{d1}$" and "$P_{d2}$" and their associated load demand pressures "$P_{L1}$" and "$P_{L2}$" is the compensating differential pressure "$dP_1$" of the differential pressure relief valves 88 and 108. These close relationships can be expressed in equation form as follows:

$$P_{d1} = P_{L1} + dP_1 \tag{5}$$

$$P_{d2} = P_{L2} + dP_1 \tag{6}$$

Any differences between the displacer discharge pressures "$P_{d1}$" and "$P_{d2}$" are exploited by correspondingly reducing the discharge pressure "$P_p$" of the fixed displacement pump 62 similar to the preceding embodiment as explained with reference to equations (1) through (4). However, the relative capacities "$C_{d1}$" and "$C_{d2}$" of the displacers 74 and 76 are preferably sized to match a ratio of the desired maximum flow rates to the two loads 92 and 112. Additional displacers can be added in tandem, along with similarly configured flow control valves, to save energy in fixed displacement systems supplying fluid to more than two loads.

Figure 3:
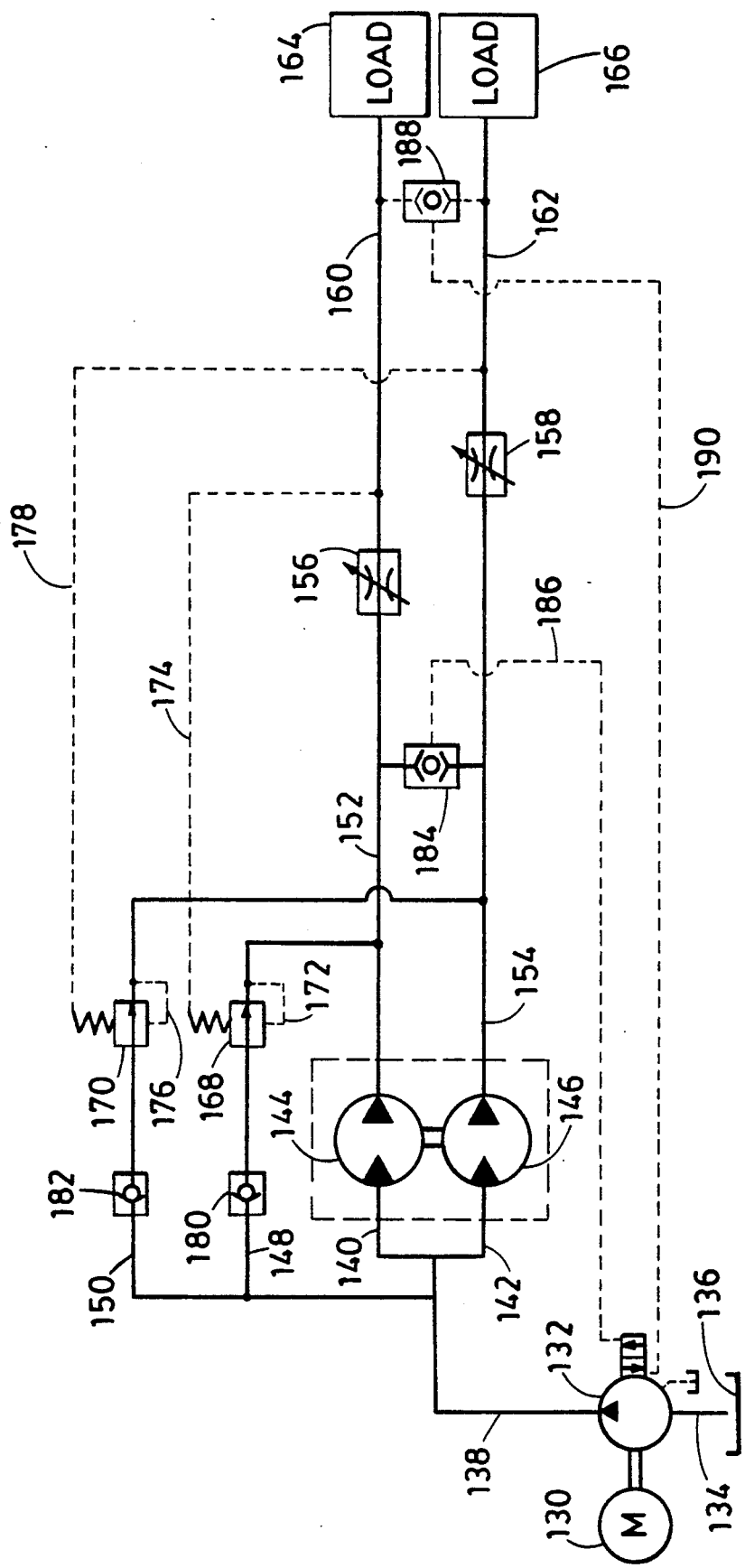
FIG. 3 is a circuit diagram showing my regenerator configured with two displacers and two restrictor type pressure compensated flow control valves for independently regulating flows to two loads within a system supplied by a load sensing variable displacement pump.

However, the embodiment of FIG. 3, in which a prime mover 130 drives a load sensing variable displacement pump 132, is preferably limited to supplying fluid to just two loads. The fluid is initially conducted to an inlet of the variable displacement pump 132 along an inlet line 134 from a reservoir 136. A working line 138 connected to an outlet of the variable displacement pump splits both into a pair of branch lines 140 and 142 that connect to respective inlets of displacers 144 and 146 and into a pair of bypass lines 148 and 150 that connect indirectly to respective outlets of the same displacers 144 and 146. More particularly, the bypass lines 148 and 150 respectively merge with working lines 152 and 154 that are connected to the outlets of the displacers 144 and 146.

The two displacers 144 and 146 are mechanically interconnected in tandem for dividing flows of fluid in the branch lines 140 and 142 into predetermined proportions. The working lines 152 and 154 conduct the divided flows of fluid to inlets of adjustable restrictor type pressure compensated flow control valves 156 and 158. Regulated flows of fluid are conducted from outlets of the two flow control valves 156 and 158 to respective loads 164 and 166 along working lines 160 and 162.

Similar to the bypass type flow control valves of the preceding embodiments, the restrictor type flow control valves 156 and 158 are made up of components including a throttle valve (not shown). However, instead of exhausting excess flow for maintaining the compensating differential pressure "$dP_1$" across the throttle valve, a pressure control valve (also not shown) is connected in series with the throttle valve for maintaining the compensating differential pressure "$dP_1$" by further restricting flow through the throttle valve. Thus, the total differential pressure across each of the flow control valves 156 and 158 is equal to the sum of the differential pressures across their respective throttle and pressure control valves.

The total differential pressure across each of the flow control valves 156 and 158 is further controlled in two different ways. First, a pair of modulating valves 168 and 170 regulate respective flows in bypass lines 148 and 150 to make sure that at least a predetermined minimum pressure differential is maintained across both flow control valves 156 and 158. Second, the variable displacement pump 132 is controlled to maintain a predetermined pressure differential across one of the flow control valves 156 or 158 having the highest pressure load demand.

A first pair of pilot lines 172 and 174 communicate respective pilot pressures from the working lines 152 and 160 to the modulating valve 168, and a second pair of pilot lines 176 and 178 communicate respective pilot pressures from working lines 154 and 162 to the modulating valve 170. Both of the modulating valves 168 and 170 are initially open but are closed by differences between the pilot pressures above a predetermined modulating differential pressure setting "$dP_2$".

In other words, the modulating valves 168 and 170 allow pressurized flow from working line 138 to bypass the displacers 144 and 146 when pressure differences across the flow control valves 156 and 158 drop below the modulating differential pressure "$dP_2$". Preferably, the modulating differential pressure "$dP_2$" of the modulating valves is greater than the compensating differential pressure "$dP_1$" of the flow control valves to support conventional operations of the flow control valves. Check valves 180 and 182 prevent reverse flow in the bypass lines 148 and 150 and allow either of the displacers 144 or 146 to operate as a pump.

A first shuttle valve 184 communicates the higher of pressures in the working lines 152 and 154 to a pilot line 186. A second shuttle valve 188 communicates the higher of pressures in the working lines 160 or 162 to a pilot line 190. The geometric capacity of the variable displacement pump 132 is varied to maintain a predetermined operating differential pressure "$dP_3$" between the pilot lines 186 and 190. Preferably, the operating differential pressure "$dP_3$" of the variable displacement pump 132 is less than the modulating differential pressure "$dP_2$" of the modulating valves 168 and 170 to make sure that sufficient flow reaches the flow control valves 156 and 158.

For example, when one of the flow control valves 158 is closed, the displacers 144 and 146 are prevented from rotating. Opening the other flow control valve 156 causes displacer discharge pressure "$Pd_1$" in line 152 to drop until the modulating valve 168 opens. An adequate supply of pressurized fluid reaches the flow control valve 156 through the bypass line 148. However, the variable displacement pump 132 further regulates the flow to the flow control valve 156 to maintain the operating differential pressure "$dP_3$" across the flow control valve 156

The displacers 144 and 146 participate in saving energy under certain conditions in which both flow control valves 156 and 158 are open. Assuming the load 166 has the highest load pressure demand "$P_{L2}$", when a ratio of the desired flow rates to the loads 164 and 166 exceeds a ratio of the geometric capacities of the displacers 144 and 146, the displacer 144 operates as a motor for driving the displacer 146 as a pump. Check valve 182 prevents reverse flow through the bypass line 150.

The discharge pressure "$P_{d1}$" of displacer 144 continues to drop in response to increases in the desired flow rate to the load 164 until the modulating valve 168 opens to assure that an adequate supply of fluid reaches the flow control valve 156. Maximum regeneration and associated energy savings occur when the modulating valve 168 begins to open. The ratio of desired flow rates to the lower and higher pressure loads 164 and 166 that is required to open the modulating valve 168 exceeds the ratio of the geometric capacities of the displacers 144 and 146 as a function of the volumetric inefficiency of the displacers. Thus, volumetric inefficiencies of the displacers 144 and 146 are accommodated through variations in flow rates without decreasing the maximum amount of energy savings for given load demand pressures "$P_{L1}$" and "$P_{L2}$".

However, different valving configurations are preferred for supplying flow from a variable displacement to more than two loads. For example, FIG. 4 depicts such a preferred configuration for a load sensing variable displacement pump, and FIG. 5 depicts the kind of changes needed to substitute a pressure compensated variable displacement pump.

Figure 4:
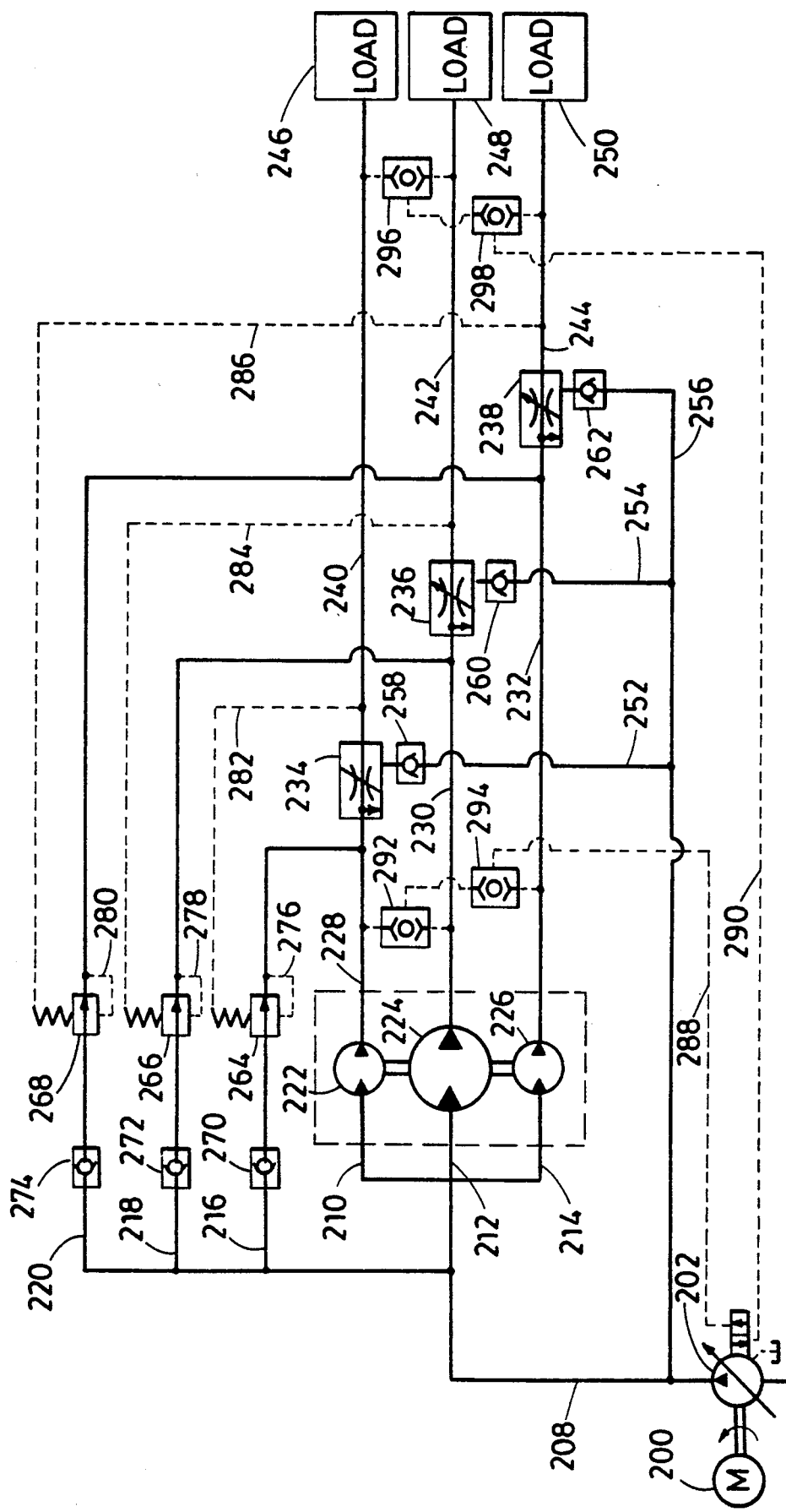
FIG. 4 is a circuit diagram showing my regenerator configured with three displacers and three combination bypass and restrictor type pressure compensated flow control valves for independently regulating flows to three loads within a system supplied by a load sensing variable displacement pump.
Figure 5:
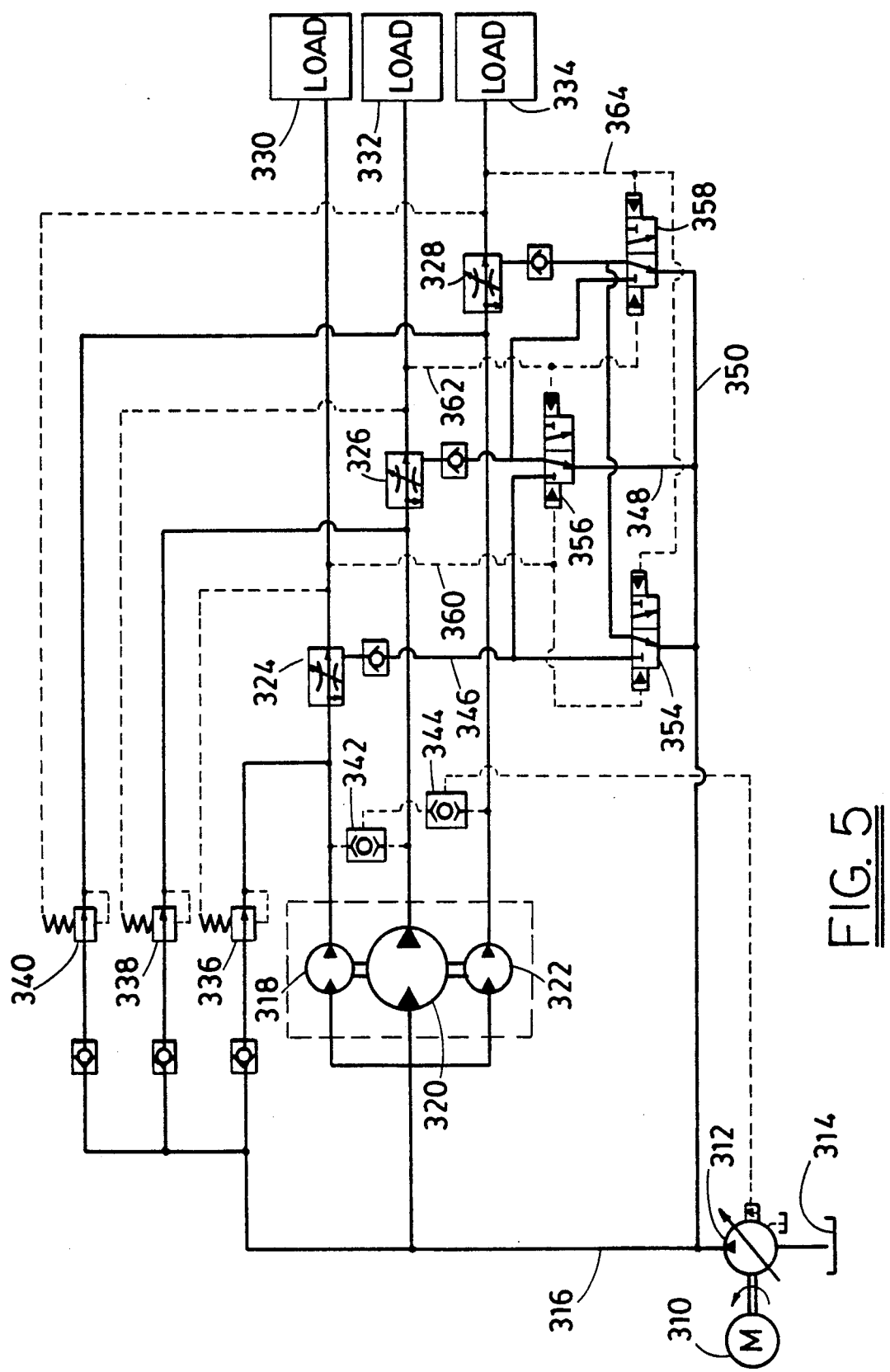
FIG. 5 is a circuit diagram showing my regenerator configured with three displacers and three combination bypass and restrictor type pressure compensated flow control valves for independently regulating flows to three loads within a system supplied by a pressure compensated variable displacement pump.

In FIG. 4, a prime mover 200 drives a load sensing variable displacement pump 202, which draws fluid from a reservoir 206 along an inlet line 204. Working line 208, which conducts discharge from the variable displacement pump, splits into three branch lines 210, 212, and 214 and into three bypass lines 216, 218, and 220.

The three branch lines 210, 212, and 214 form a common inlet for three displacers 222, 224, and 226 that are mechanically interconnected in tandem. However, working lines 228, 230, and 232 separately connect outlets of the three displacers 222, 224, and 226 with inlets of combination bypass and restrictor type pressure compensated flow control valves 234, 236, and 238. Outlets of the flow control valves 234, 236, and 238 are connected to loads 246, 248, and 250 along working lines 240, 242, and 244. Recirculating lines 252, 254, and 256 connect the flow control valves 234, 236, and 238 to the working line 208. Check valves 258, 260, and 262 prevent reverse flow from the working line to each of the flow control valves 234, 236, and 238.

Where possible, a combination of series restriction and parallel bypass techniques is used to maintain the compensating differential pressure "$dP_1$" across throttle valve portions of the flow control valves 234, 236, and 238. However, respective flows through the recirculating lines 252, 254, and 256 require displacer discharge pressures "$P_d$", "$P_{d2}$", or "$Pd3$" in the working lines 228, 230, and 232 greater than the pump discharge pressure "$P_p$" in the working line 208 by an amount sufficient to overcome resistance to the recirculating flow.

The bypass lines 216, 218, and 220 provide an alternative connection between the working line 208 and the working lines 228, 230, and 232. Modulating valves 264, 266, and 268 regulate flows through the bypass lines 216, 218, and 220 to make sure that each of the flow control valves 234, 236, and 238 receives an adequate supply of fluid independently of the flow rates discharged from the displacers 222, 224, and 226. Check valves 270, 272, and 274 prevent reverse flow through the bypass lines 216, 218, and 220.

Pilot lines 276, 278, and 280 communicate the displacer discharge pressures "$P_{d1}$", "$P_{d2}$", and "$P_{d3}$" as first pilot pressures to the modulating valves 264, 266, and 268; and pilot lines 282, 284, and 286 communicate load demand pressures "$P_{L1}$", "$P_{L2}$", and "$P_{L3}$" from the working lines 240, 242, and 244 as second pilot pressures to the modulating valves 264, 266, and 268. Similar to the preceding embodiment, the modulating valves are biased to an open position but are closed by pressure differences between the first and second pilot pressures greater than the modulating differential pressure "$dP_2$".

Also similar to the preceding embodiment, the geometric capacity of the load sensing variable displacement pump 202 is varied to maintain the operating differential pressure "$dP_3$" between two pilot pressures communicated by a pair of pilot lines 288 and 290. Shuttle valves 292 and 294 identify and isolate the highest of the displacer discharge pressures "$P_{d1}$", "$P_{d2}$", and "$P_{d3}$" as one of the pilot pressures; and shuttle valves 296 and 298 isolate the highest of the load demand pressures "$P_{d1}$", "$P_{d2}$", and "$P_{d3}$" as the other pilot pressure. The operating differential pressure "$dP3$" of the pump is preferably less than the modulating differential pressure "$dP_2$" of the modulating valves. However, in contrast to the preceding embodiment, the operating differential pressure "$dP_3$" of the variable displacement pump is also preferably less than the compensating differential pressure "$dP_1$" of the flow control valves.

The latter mentioned relationship between the differential pressure settings "$dP_1$" and "$dP_3$" has the effect of blocking recirculating flow from the flow control valve regulating flow to the load having the highest pressure demand. Any of the flow control valves 234, 236, and 238 that are blocked from recirculating flow, albeit by the pressure "$P_p$" or the differential pressure settings "$dP_1$" and "$dP_3$", potentially limit the rotational speed of the displacers 222, 224, and 226. During regeneration, the flow control valve servicing the highest pressure demand limits rotational speed of the displacers 222, 224, and 226 to permit increased flow rates through other of the flow control valves to compensate for volumetric inefficiencies of the displacers.

One or more but not all of the displacers 222, 224, and 226 can be operated as a recirculator for diverting excess flow away from one or more of the loads 246, 248, and 250 without limiting the rotational speed of the displacers. The discharge pressure "$P_{d1}$", "$P_{d2}$", or "$P_{d3}$" of any of the displacers operating as recirculators must exceed the pump discharge pressure "$P_p$" by an amount sufficient to overcome the resistance to flow through the active recirculating lines 252, 254, or 256. Operating one of the displacers as a recirculator allows other of the displacers to operate as pumps or motors even though little or no flow is required by one of the loads. The volumetric inefficiencies of the displacers 222, 224, and 226 allow more than one displacer to operate as a motor over a range of different flow rates between the displacers operating as motors.

The pump discharge pressure "$P_p$" can be calculated in much the same way as in the preceding embodiments but with an equation that accounts for a third displacer as follows:

$$P_p = P_{d1} C_{d1} + P_{d2} C_{d2} + P_{d3} C_{d3} \tag{7}$$

where "$C_{d3}$" is the fractional portion of the total geometric capacity of the displacers contributed by the third displacer.

Assuming the load 246 as having the highest pressure demand "$P_{L1}$", the amount of reduction "$P_r$" in the pump discharge pressure due to regeneration can be calculated as follows:

$$P_r = P_{d1} - P_p = P_{L1} + dP_3 - p_p \tag{8}$$

The amount of energy savings "$E_s$" over conventional load sensing systems varies as a product of the pressure reduction "$P_r$" and the instant output flow "$Q_p$" of the pump as written in equation (4) above.

FIG. 5 depicts a fluid power system similar to the system of FIG. 4 but modified to incorporate a pressure compensated variable displacement pump 312 instead of a load sensing variable displacement pump. The pressure compensated variable displacement pump 312 is driven by a prime mover 310 for drawing fluid from a reservoir 314 and for discharging pressurized fluid into a working line 316.

The flow of pressurized fluid is conducted to a common inlet of three displacers 318, 320, and 322 for displacing predetermined proportions of flow. Combination bypass and restrictor type pressure compensated flow control valves 324, 326, and 328 regulate flows of fluid discharged from the three displacers 318, 320, and 322 to respective loads 330, 332, and 334.

Modulating valves 336, 338, and 340 assure that an adequate supply of fluid from the working line 316 reaches the flow control valves 324, 326, and 328 independently of the relative flows discharged from the displacers 318, 320, and 322. The modulating differential pressure "$dP_2$" at which the modulating valves 336, 338, and 340 are closed is preferably greater than the compensating differential pressure "$dP_1$" of the flow control valves 324, 326, and 328 to assure proper operation of the pressure compensating feature of the latter valves. However the difference between the differential pressure settings "$dP_1$" and "$dP_2$" is kept small to allow maximum pressure drops across displacers operating as motors.

Shuttle valves 342 and 344 isolate the highest of displacer discharge pressures "$P_{d1}$", "$P_{d2}$", and "$P_{d3}$" as a pilot pressure to pressure compensated variable displacement pump 312. The geometric capacity of the variable displacement pump 312 is varied to match the pilot pressure to a given system pressure "P$_c$". The actual discharge pressure "P$_p$" of the pump 312 is reduced with respect to the given system pressure "Pc" by the amount of regeneration in accordance with the following relationship:

$$P_p = P_c - P_r \qquad (9)$$

Excess flows discharged by the displacers are returned to the working line 316 by the flow control valves 324, 326, and 328 along respective recirculating lines 346, 348, and 350. However, recirculating flow through the flow control valve regulating flow to the load having the highest pressure demand is isolated and blocked by a network of two position directional valves 354, 356, and 358. Pilot lines 360, 362, and 364 communicate respective demand pressures "P$_{L1}$", "P$_{L2}$", and "P$_{L3}$" in different pairs to each of the directional valves 354, 356, and 358 for making the logical comparisons necessary to block flow in the appropriate recirculating line.

The same or an alternative arrangement of valving for blocking recirculation through the flow control valve servicing the highest pressure load could be substituted in the preceding embodiment in place of the specified relationship between the differential pressures "dP$_1$" and "dP$_3$" of the flow control valves and the load sensing pump. This would enable the flow control valves of the preceding embodiment to retain control over their pressure compensating function while satisfying the highest pressure demand.

Figure 6:
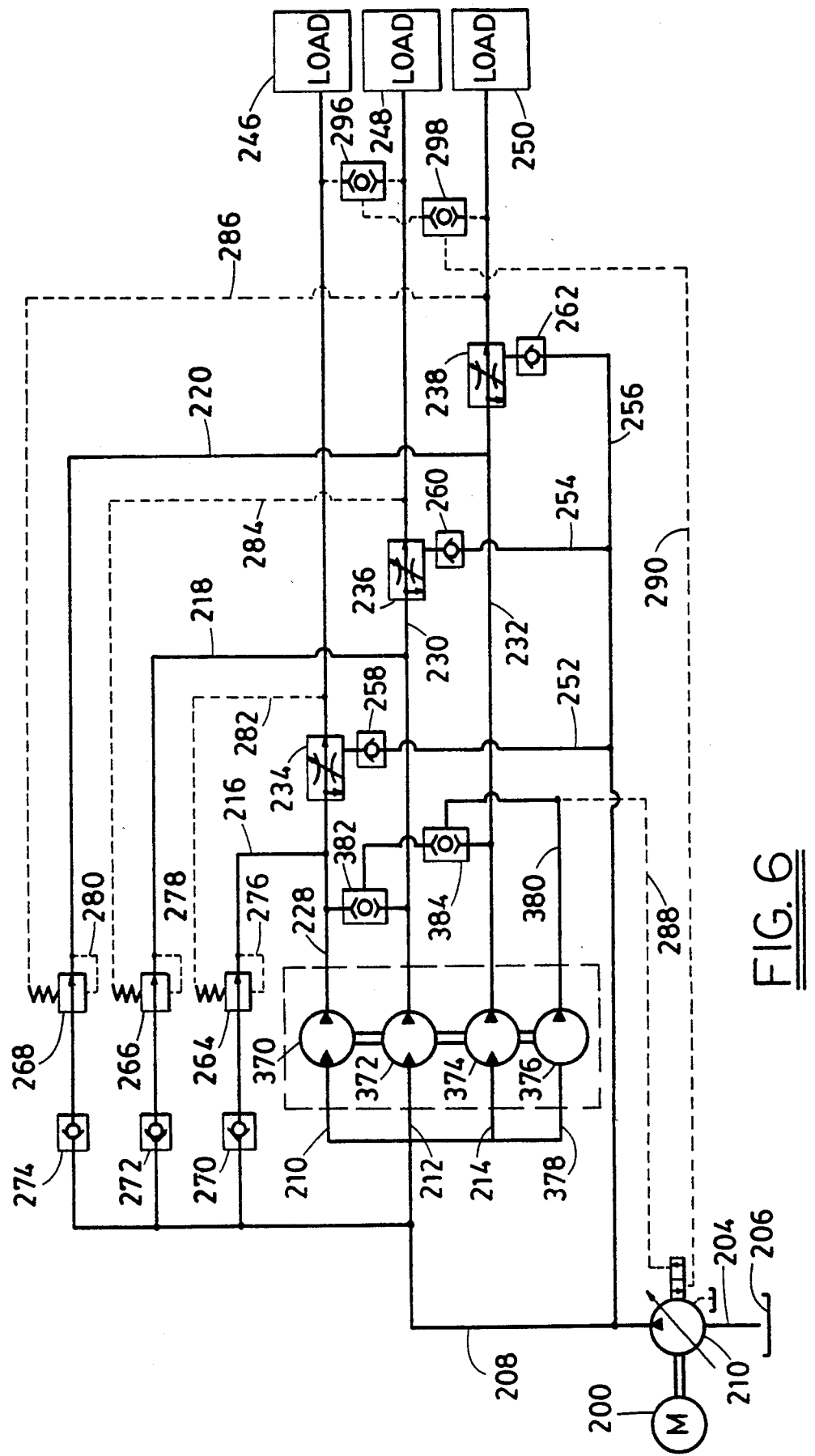
FIG. 6 is a circuit diagram similar to FIG. 4 but showing an additional displacer that can be alternatively connected in parallel with one of the three displacers having the highest outlet pressure.

FIG. 6 depicts an addendum to FIG. 4 with common features denoted by the same reference numerals. However, in place of the three unequally sized displacers 222, 224, and 226, the embodiment of FIG. 6 includes four equally sized displacers 370, 372, 374, and 376 interconnected in tandem. An additional branch line connects an inlet of the displacer 376 with the working line 208.

However, instead of supplying flow to a fourth load, an additional working line 380 connected to the outlet of the displacer 376 supplies additional flow to one of the other working lines 228, 230, or 232 exhibiting the highest of the displacer discharge pressures "dP$_1$", "dP$_2$", or "dP$_3$". Shuttle valves 382 and 384 are modified to conduct the additional flow in working line 380 to the appropriate one of the working lines 228, 230, or 232.

During regeneration, the displacer 376 operates as a pump in parallel with one of the other displacers, thereby effectively doubling the portion of the total geometric capacity of the displacers committed to pumping operations. Although the increased pumping capacity decreases mechanical advantage of the displacers operating as motors with respect to the displacers operating as pumps and correspondingly diminishes the pressure reduction "P$_r$" of the pump discharge pressure "P$_p$", many more combinations of desired flow rates to the loads 246, 248, and 250 are capable of initiating regeneration.

Given the equally sized displacers 370, 372, 374, and 376, regeneration is initiated when the desired flow rate to any one of the lower pressure loads reaches just one-half of the desired flow rate to the highest pressure load. Desired flow rates to the lower pressure loads exceeding one-half of the desired flow rate to the highest pressure load compensate for volumetric inefficiencies of the displacers up to a maximum pressure reduction "P$_r$" in the working line 208 equivalent to the theoretical pressure reduction "P$_r$" of displacers having 100% volumetric efficiency.

Although all four of the displacers 370, 372, 374, and 376 have equal geometric capacities, the displacers 370, 372, and 374 could also be sized to better match expected flow rates to each of the loads 246, 248, and 250. The size of displacer 376 could also be changed to improve overall energy savings for the expected flow rates. In addition, the displacer 376 could be made with a variable geometric capacity to further improve energy savings over a wider range of flow rates to the loads.

In each of the above examples, a collection of lines, valves, displacers, pressure settings, and their logical interrelationships forms a fluid control system for identifying potential energy savings between branch lines and for reducing a supply pressure at a source of fluid flow to more closely match a total demand for power by the branches. However, conventional electronic controls could be substituted for the fluid controls to accomplish similar functions. For example, pressure sensors could be substituted for pilot lines.

All of the foregoing examples also feature flow control valves that regulate a single direction of flow through the loads. However, the flow control valves could also be arranged in a well-known manner to regulate bidirectional flow through the loads for controlling power converting devices such as reversible motors and double-acting cylinders. For example, the throttle valve portion of the flow control valves could be replaced by a throttling four-way directional control valve to regulate opposite directions of flow through the loads.

Reference has also been made throughout this specification to lines interconnecting components of my regenerator. However, these lines are also intended to include a variety of known components for conducting fluid including channels, passages, and conduits. For example, the flow paths within my regenerator are preferably constructed as passages within an integrated circuit block or stack.

I claim:

1. A regenerator for use in a system conveying fluid power as a flow of fluid under pressure to one or more loads comprising:

first and second displacers that are mechanically connected with each other for dividing the flow of fluid into predetermined proportions;

said first and second displacers having an inlet and respective outlets;

first and second flow control valves for regulating different portions of the flow of fluid to the one or more loads;

said first and second flow control valves having respective inlets and outlets;

a first working line for connecting a supply of the flow of fluid to said inlet of the displacers at a first pressure;

second and third working lines for respectively connecting said outlets of the displacers to said inlets of the first and second flow control valves at second and third pressures; and a control system responsive to a difference between said second and third pressures for reducing said first pressure with respect to a higher of said second and third pressures.

2. The regenerator of claim 1 further comprising fourth and fifth working lines for respectively connecting said outlets of the first and second flow control valves to the one or more loads at respective fourth and fifth pressures.

3. The regenerator of claim 2 in which said control system includes first and second pressure regulators that provide for regulating respective differential pressures across said first and second flow control valves between said second and fourth pressures and between said third and fifth pressures.

4. The regenerator of claim 3 further comprising first and second return lines for respectively diverting excess flows of fluid from said fourth and fifth working lines.

5. The regenerator of claim 4 in which said first and second flow control valves include throttling valves, and said first and second pressure regulators provide for maintaining predetermined compensating differential pressures across said throttling valves by diverting the excess flows of fluid from said fourth and fifth working lines to said first and second return lines.

6. The regenerator of claim 5 further comprising a pilot operated relief valve for discharging excess flow from said first working line to said reservoir based on a pilot signal taken from the higher of said second and third pressures.

7. The regenerator of claim 5 in which said first and second return lines provide for conducting the excess flows of fluid to a reservoir.

8. The regenerator of claim 7 in which said fourth and fifth working lines are joined to form a common working line for conducting the flow of fluid to a single load.

9. The regenerator of claim 8 in which said first and second flow control valves have a common actuator for operating said first and second flow control valves in a predetermined sequence for regulating the flow through said common working line to the single load.

10. The regenerator of claim 9 in which said first and second displacers have different geometric capacities.

11. The regenerator of claim 10 in which fourth and fifth pressures are equal to a demand pressure of the single load, and positioning one of said first and second flow control valves in an open position and the other of said first and second flow control valves in a closed position reduces said first pressure with respect to said demand pressure of the single load.

12. The regenerator of claim 5 further comprising pairs of pilot lines for communicating said differential pressures across said throttling valves to said first and second pressure regulators.

13. The regenerator of claim 12 further comprising pressure relief valves respectively connected to one of said pilot lines in each pair for limiting pressure in said one pilot line in each pair to predetermined relief pressures.

14. The regenerator of claim 13 in which said first and second pressure regulators divert excess flows of fluid through said first and second return lines for limiting pressures in said second and third lines to sums of said compensating differential pressures and said relief pressures.

15. The regenerator of claim 3 in which said fourth and fifth working lines provide for separately conducting flows of fluid to different loads.

16. The regenerator of claim 15 further comprising first and second bypass lines respectively connecting said first working line to said second and third working lines.

17. The regenerator of claim 16 in which said first and second pressure regulators are primary pressure regulators that provide for restricting the flows of fluid through said first and second bypass lines in response to differential pressures across said first and second flow control valves above predetermined modulating differential pressures.

18. The regenerator of claim 17 further comprising a first pilot line for communicating the higher of said second and third pressures as a first pilot pressure and a second pilot line for communicating a higher of said fourth and fifth pressures as a second pilot pressure.

19. The regenerator of claim 18 in which said first and second pilot lines provide for controlling displacements of a variable displacement pump as a secondary pressure regulator for maintaining a predetermined operating differential pressure across one of said first and second flow control valves between the higher of said second and third pressures and the higher of said fourth and fifth pressures.

20. The regenerator of claim 19 in which said modulating differential pressures are not less than said operating differential pressure.

21. The regenerator of claim 20 in which said first and second flow control valves include throttling valves and tertiary pressure regulators for maintaining predetermined compensating differential pressures across said throttling valves by further restricting flows of fluid through said first and second flow control valves.

22. The regenerator of claim 21 in which said modulating differential pressures and said operating differential pressure are not less than said compensating differential pressures.

23. The regenerator of claim 15 further comprising:
a third displacer that is mechanically connected with said first and second displacers for further dividing the flow of fluid into three predetermined proportions;
said third displacer having an inlet and outlet;
a third flow control valve for controlling the flow of fluid to a third load;
said third flow control valve having an inlet and outlet;
said first working line also providing for connecting the supply of the flow of fluid to said inlet of the third displacer at said first pressure;
a sixth working line for connecting said outlet of the third displacer to said inlet of the third flow control valve at a sixth pressure;
a seventh working line for connecting said outlet of the third flow control valve to the third load at a seventh pressure; and
said control system being further responsive to differences between said second, third, and sixth pressures for reducing said first pressure with respect to a higher of said second, third, and sixth pressures.

24. The regenerator of claim 23 in which said control system also includes a third pressure regulator that regulates a differential pressure across said third flow control valve between said sixth and seventh pressures.

25. The regenerator of claim 24 further comprising first, second, and third recirculating lines for respectively diverting excess flows of fluid from said fourth, fifth, and seventh working lines to said first working line.

26. The regenerator of claim 25 further comprising first, second, and third check valves for preventing reverse flows of fluid from said first working line to said first, second, and third recirculating lines.

27. The regenerator of claim 26 further comprising a valve logic network for blocking recirculation through one of said first, second, and third recirculating lines that divert excess flow from one of said fourth, fifth, and seventh working lines having the highest of said fourth, fifth, and seventh pressures.

28. The regenerator of claim 27 in which said first, second, and third flow control valves include throttling valves, and said first, second, and third pressure regulators provide for maintaining predetermined compensating differential pressures across said throttling valves by diverting the excess flows of fluid from said fourth, fifth, and seventh working lines to said first, second, and third recirculating lines.

29. The regenerator of claim 28 in which said first, second, and third pressure regulators also provide for maintaining the predetermined compensating differential pressures across said throttling valves by further restricting the flows of fluid through said first, second, and third flow control valves.

30. The regenerator of claim 24 further comprising first, second, and third bypass lines respectively connecting said first working line to said second, third, and sixth working lines.

31. The regenerator of claim 30 in which said first, second, and third pressure regulators provide for restricting the flows of fluid through said first, second, and third bypass lines in response to differential pressures across said first, second, and third flow control valves above predetermined modulating differential pressures.

32. The regenerator of claim 31 in which check valves prevent reverse flows of fluid from said first, second, and third bypass lines to said first working line.

33. The regenerator of claim 15 further comprising:
a third displacer that is mechanically connected with said first and second displacers for further dividing the flow of fluid into three predetermined proportions;
said third displacer having an inlet and outlet;
said first working line also providing for connecting the supply of the flow of fluid to said inlet of the third displacer at said first pressure;
a flow path for alternatively connecting said outlet of the third displacer to said second and third working lines; and
said control system providing for connecting said outlet of the third displacer to one of said second and third working lines having the higher of said second and third pressures.

34. The regenerator of claim 33 in which said control system includes a shuttle valve for identifying the higher of said second and third pressures.

35. A fluid pumping system for supplying a flow of fluid to a plurality of loads comprising:
a variable displacement pump for supplying the flow of fluid to first and second loads;
first and second displacers that are mechanically connected to each other for displacing predetermined portions of the flow of fluid supplied by the variable displacement pump;
first and second flow control valves for controlling respective flows of fluid from said first and second displacers to the first and second loads;
a first working line for conducting the flow of fluid from the variable displacement pump to said first and second displacers at a first pressure;
second and third working lines for conducting the respective flows of fluid from said first and second displacers to said first and second flow control valves at second and third pressures;
fourth and fifth working lines for further conducting the respective flows of fluid from said first and second flow control valves to the first and second loads at fourth and fifth pressures; and
a pump control for maintaining a predetermined operating pressure differential across one of said first and second flow control valves having a higher of said second and third pressures and a higher of said fourth and fifth pressures by varying displacements of said variable displacement pump.

36. The system of claim 35 further comprising a first pilot line for communicating the higher of said second and third pressures as a first pilot pressure to the pump control, and a second pilot line for communicating the higher of said fourth and fifth pressures as a second pilot pressure to the pump control.

37. The system of claim 36 further comprising first and second bypass lines respectively connecting said first working line to said second and third working lines.

38. The system of claim 37 further comprising first and second primary pressure regulators that restrict the flows of fluid through said first and second bypass lines in response to differential pressures across said first and second flow control valves above predetermined modulating differential pressures.

39. The system of claim 38 in which said first and second flow control valves include restrictors and secondary pressure regulators for maintaining predetermined compensating differential pressures across said restrictors.

40. The system of claim 39 in which the compensating differential pressures of said secondary pressure regulators are set not greater than the operating differential pressure of the variable displacement pump and the modulating differential pressures of the primary pressure regulators.

41. The system of claim 40 in which the operating differential pressure of the variable displacement pump is set not greater than the modulating differential pressures of the primary pressure regulators.

42. The system of claim 41 in which said restrictors have variable size orifices and said secondary pressure regulators control rates of flow through said restrictors to maintain the predetermined compensating differential pressures across restrictors.

43. The system of claim 42 in which said secondary pressure regulators also include restrictors with variable size orifices connected in series with said restrictors of the flow control valves.

44. A fluid circuit for saving energy in a fluid pumping system having a variable displacement pump for supplying a flow of fluid under pressure to three or more loads comprising:
first, second, and third displacers that are mechanically connected with each other for dividing the flow of fluid into predetermined proportions;
first, second, and third flow control valves for controlling respective flows of fluid from said first, second, and third displacers to first, second, and third loads;

a first working line for conducting the flow of fluid from the variable displacement pump to said first, second, and third displacers at a first pressure;

second, third, and fourth working lines for conducting the respective flows of fluid from said first, second, and third displacers to said first, second, and third flow control valves at second, third, and fourth pressures;

fifth, sixth, and seventh working lines for further conducting the respective flows of fluid from said first, second, and third flow control valves to the first, second, and third loads at fifth, sixth, and seventh pressures; and first, second, and third recirculating lines for diverting excess flows of fluid from said fifth, sixth, and seventh working lines to said first working line.

45. The circuit of claim 44 further comprising a control system for blocking recirculation through one of said first, second, and third recirculating lines that divert excess flow from one of said fifth, sixth, and seventh working lines having the highest of said fifth, sixth, and seventh pressures.

46. The circuit of claim 45 in which said control system includes a pressure regulator for maintaining a predetermined operating differential pressure across one of said first, second, and third flow control valves between a higher of said second, third, and fourth pressures and a higher of said fifth, sixth, and seventh pressures.

47. The circuit of claim 46 in which said first, second, and third flow control valves include restrictors, and said control system includes additional pressure regulators for maintaining predetermined compensating differential pressures across said restrictors by diverting the excess flows of fluid from said fifth, sixth, and seventh working lines to said first, second, and third recirculating lines.

48. The circuit of claim 47 in which said control system provides for blocking recirculation through one of said first, second, and third recirculating lines by setting said operating differential pressure less than said compensating pressure differential.

49. The circuit of claim 47 in which said additional pressure regulators also include restrictors with variable size orifices connected in series with said restrictors of the flow control valves for maintaining the predetermined compensating differential pressures across said restrictors.

50. The circuit of claim 49 further comprising first, second, and third bypass lines respectively connecting said first working line to said second, third, and fourth working lines.

51. The circuit of claim 50 in which said control system includes further additional pressure regulators for restricting the flows of fluid through said first, second, and third bypass lines in response to differential pressures across said first, second, and third flow control valves greater than predetermined modulating differential pressures.

52. The circuit of claim 51 in which said predetermined modulating differential pressures are set greater than said operating differential pressure.

53. The circuit of claim 44 further comprising:
a fourth displacer that is mechanically connected with said first, second, and third displacers for further dividing the flow of fluid into four predetermined proportions;

said first working line also providing for conducting the flow of fluid from the variable displacement pump to said fourth displacer at said first pressure;

a flow path providing for alternatively conducting the flow of fluid from said fourth displacer to one of said second, third, and fourth working lines; and a control system providing for identifying a highest of said second, third, and fourth pressures and for directing the flow of fluid from said fourth displacer to the one of said second, third, and fourth working lines having the highest pressure.

54. The circuit of claim 53 in which said control system includes a pair of shuttle valves connected in series for identifying the higher of said second, third, and fourth pressures.

55. The circuit of claim 54 in which all four of said displacers have equal geometric capacities.

* * * * *